March 23, 1971 A. A. HIRSCH 3,572,391
FLOW UNIFORMIZING BAFFLING FOR CLOSED PROCESS VESSELS
Filed July 10, 1969 2 Sheets-Sheet 1
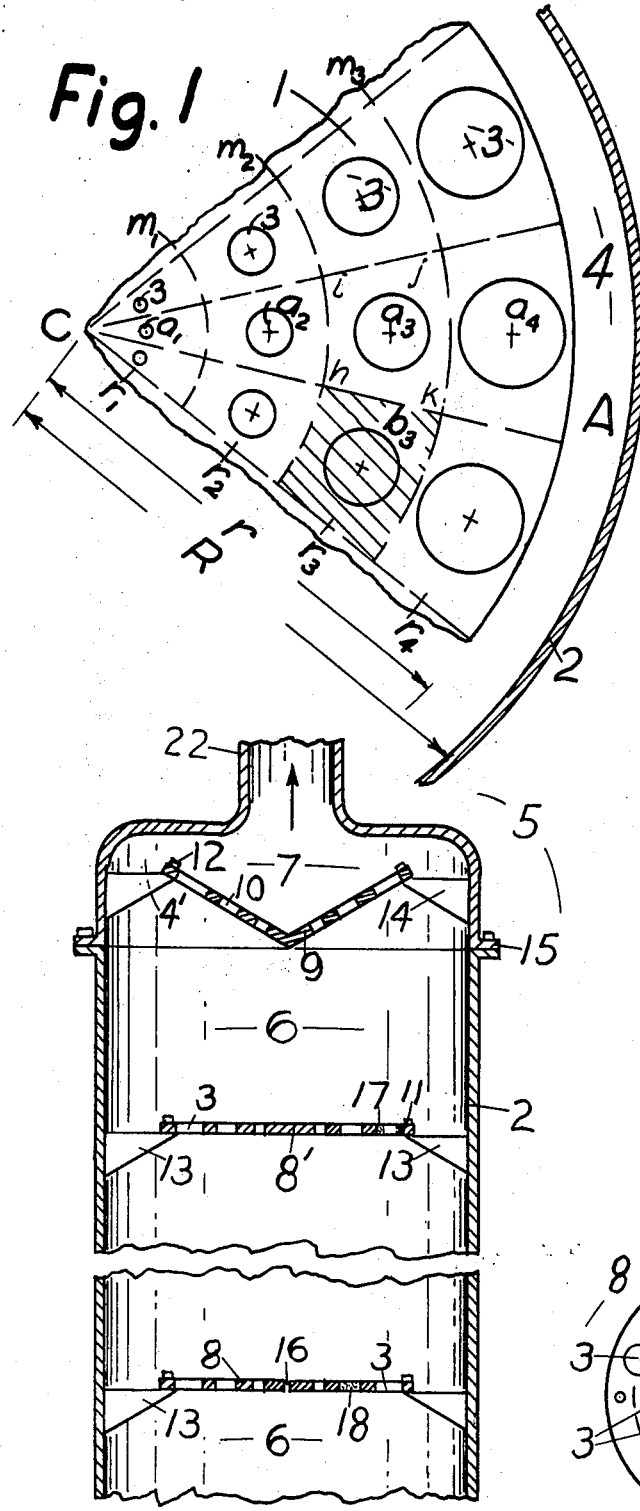
Fig. 1
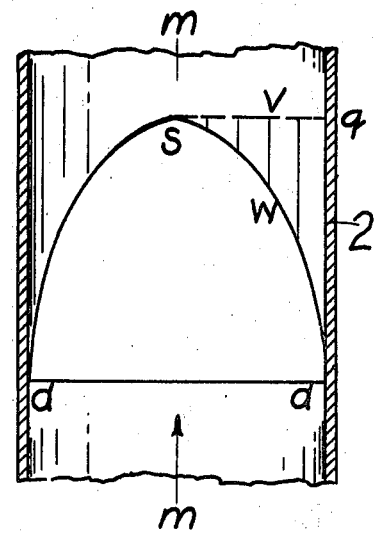
Fig. 2
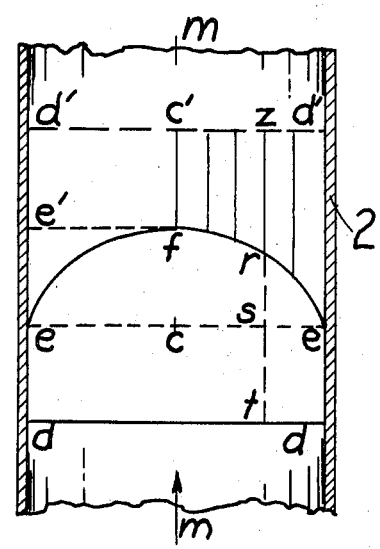
Fig. 3
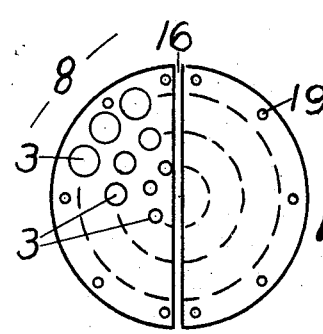
Fig. 5
Fig. 4
INVENTOR.
A. Adler Hirsch March 23, 1971  A. A. HIRSCH  3,572,391

FLOW UNIFORMIZING BAFFLING FOR CLOSED PROCESS VESSELS

Filed July 10, 1969  2 Sheets-Sheet 2 a. Adler Hirsch
INVENTOR

United States Patent Office
3,572,391
Patented Mar. 23, 1971

3,572,391
FLOW UNIFORMIZING BAFFLING FOR CLOSED PROCESS VESSELS
A. Adler Hirsch, 141 Norwood St.,
Shreveport, La. 71105
Continuation-in-part of application Ser. No. 600,878,
Dec. 12, 1966. This application July 10, 1969,
Ser. No. 840,717
Int. Cl. F15d 1/02
U.S. Cl. 138—40
10 Claims

ABSTRACT OF THE DISCLOSURE

Within closed flow vessels velocity is greatest at the center and decreases toward the walls. This non-uniformity predominates more with laminar flow than with turbulent flow. Near the outlet a directional effect further funnels flow centerward. Both of these short-circuiting actions are corrected by regulating hydraulic resistance transversely as by a series of orified guidance baffles having ratio of open area per unit gross area of contiguous surface increasing with radial distance from axis of flow or sets of stacked meshed discs of different diameters. These favor the distal flow lines. Best control at the outlet is by a contoured shape pointing against the direction of flow.

---

Figure 6:
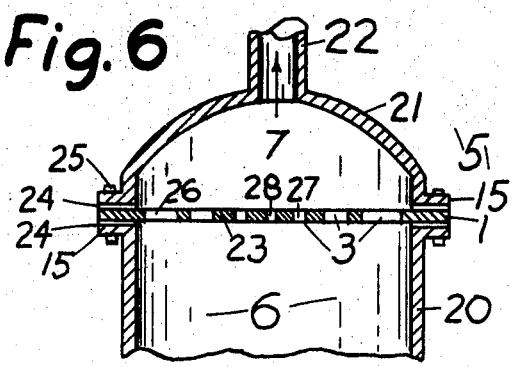

This application is a continuation-in-part of my copending application Ser. No. 600,878, filed Dec. 12, 1966 for "Flow Uniformizing Effluent Baffle for Closed Process Vessels," now abandoned.

My device controls the path of fluids through closed vessels, both in the run of the length and near the outlet region. It prevents the channeling or short circuiting of the centrally flowing liquid or gas due to wall friction and funneling of effluent to the outlet by establishing uniform velocity of approach throughout transverse cross sections. By equalizing distribution of flow lines efficiency in performance, equality in residence time and uniformity in product is achieved.

In general, closed process vessels are provided with distributive means at the inlet, but convergence of stream lines at the exit is invariably ignored. Such convergence causes disparities in flow back within the body portion of the vessel superimposed upon those caused by differences in velocity profiles across a diameter incident to flow regime. Experimental observation and verification of unequal flow distribution has been particularly noted during the course of the backwashing operation in pressure filters, as reported by applicant in "Filter Backwashing Tests and Upflow Equalization," Journal of the Sanitary Engineering Division, Proceedings of the American Society of Civil Engineers, vol. 94, No. SA1, Proc. Paper 5813, February 1969, pp. 129–146, especially in Cases 7 and 8 dealing with closed filters which have a single central outlet in the roof. Backwashings streak preferentially to this point, by-passing lateral spaces, thereby reducing efficiency of the whole process.

Whereas this invention is not concerned with details of structures at the inlet of closed vessels, the flow equalizing principle herein proposed along the intermediate segments and at the outlet will to an appreciable extent correct deficiencies in distribution at the inlet.

In many processes, such as continuous washing, pressure filtration, ion exchange, and in chemical reactions dependent upon contact time, it is desirable for all particles of fluid, liquid or gaseous, to pass through the processing vessel in the same length of time. Such a provision allows the same progress or extent of treatment or reaction to all portions of the fluid, thereby producing a uniform product. Such uniformity in transit through a vessel can be achieved only if the entrance provides for complete cross-sectional distribution of the fluid, the intermediate section, if long, has velocity equalizing baffles, and linear motion of the fluid to a controlling front or surface slightly in advance of the point of draw-off is established.

The principal object of this invention is to describe a set of perforate training devices that will enforce uniformity or plug type flow in the running length and in the effluent section of a closed vessel immediately in advance of the outlet region.

Another object of this invention is to disclose a competent baffling structure that accomplishes its equalizing purpose with the very minimum loss of head or energy requirement to propel the fluid through the vessel.

A further object is the attainment of plug flow or nearly uniform residence time during traverse of a continuous flow vessel, and to accomplish this objective without recourse to walled off divisions of the vessel into individual discrete compartments.

An adaptation of these principles to open gravity filters appears in my Pat. No. 3,313,420. Also my Pat. No. 3,221,889 describes several modifications of structure to provide linear parallel flow filaments toward the effluent end of open tanks, basins and reservoirs. Usually, these vessels are equipped with effluent launders and the flow equalizer is installed in advance of these members. In closed vessels troughs and launders are generally absent, hence the device as applied to open vessels is inapplicable without suitable adaptation. In current practice typical draw-offs from closed vessels are simply an open ended pipe connected to the discharge end or an outlet proceded either by a solid deflecting plate or some sort of meshed strainer to prevent passage of particulate matter.

Since the principle underlying the effectiveness of the inclined orificed baffle described in the second patent reference may be utilized in closed vessels another object of this invention is to apply, with suitable modification, these ideas toward equalizing passage and parallelizing effluent approach currents in closed tanks and vessels without limitation on pressure, either positive or negative.

The desired objectives are accomplished by installing a series of velocity-compensatory baffles in the run of the vessel and by preceding the discharge conduit or conduits each by a gradated orificed baffle extending radially in all directions from the axis of discharge. When a single draw-off is employed the terminal training baffle extends near or to the side of the vessel; when two or more draw-offs are used a corresponding number of training baffles each extend across the zone from which its respective draw-off removes fluid. Usually the axis or center of the discharge conduit is continuous with the axis or center of the closed flow vessel. Perforations in the baffle may vary in size, shape, number, thickness, roughness and arrangement according to the radial distance from the axis of the vessel or of the discharge passages. Hydraulic resistance at any locus on the baffle is made to vary in an inverse manner with the distribution of flow lines or velocities frontal to the baffle prior to its insertion, in this way posing localized resistances to counter the disparities in flow and establishing equal velocity of approach across the full facial area of a baffle.

Ordinarily such a baffle is a plate of uniform thickness; the distribution of passageways correct the inequality in flow by providing the larger concentrations of area of openings relative to basic baffle surface at greater radial distances from the axes of flow. Conversely a baffle may be a rigid wire mesh combination overlay of different diameter discs such that their composite thickness decreases radially outward.

For baffles within the intermediate portion of a vessel having laminar flow an orificed plate will suffice provided the distribution of open areas relative to gross baffle surface is inverse to the well-known parabolic velocity profile across a diameter. This profile varies with Reynolds number, so that the orifice pattern should conform to the conditions of use. If operating conditions should change the opening arrangement may be revised accordingly. Should the perforations too large or too numerous they may be bushed or plugged, respectively. Otherwise, average conditions should be anticipated.

For a terminal baffle in advance of the outlet, a perforated cone or dished plate is preferable with apex or convexity, respectively, projecting forward against the direction of flow. This geometry is selected to reach into the bulk of the fluid and intercept various concentric radial sheathes at different longitudinal distances before they reach the outlet. This prevents concentration of fluid into a short-circuiting core which leaves consequent dead storage or stagnation in the distal portion of the effluent section and even back into the reaction or contact zone in the main body of an unbaffled vessel.

REFERENCE TO DRAWINGS

Figure 9:
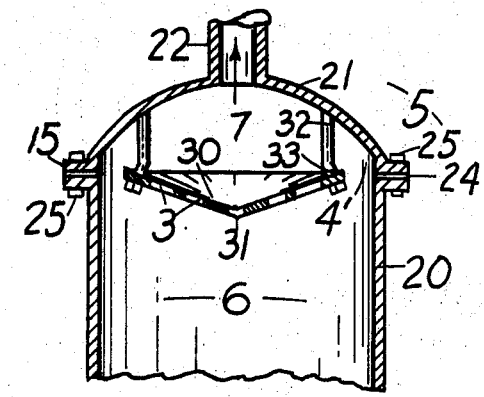
Figure 7:
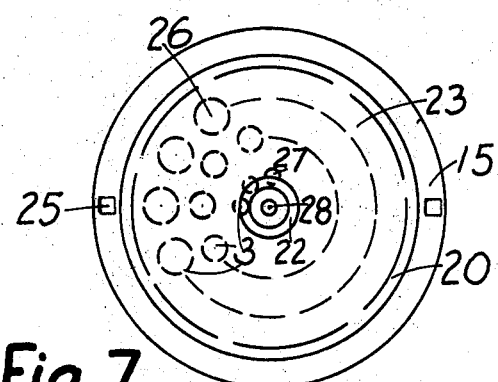
Figure 10:
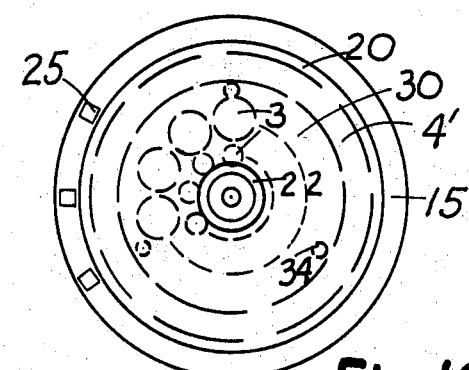
Figure 8:
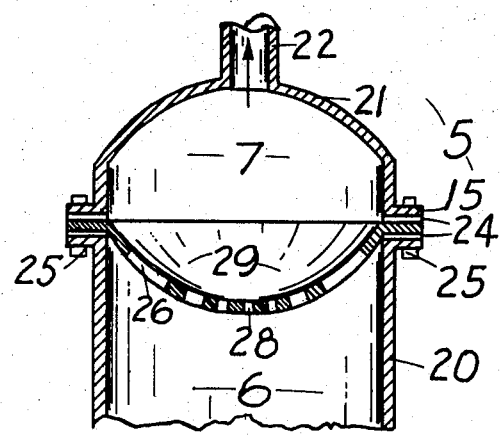
Figure 11:
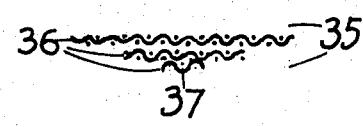

Various aspects of my invention are illustrated in the drawing in which:

FIG. 1 is a diagram illustrating in plan the basic principle in the areal distribution of openings through a flow uniformizing baffle, FIG. 2 is a diagram showing the theoretical distribution of areal openings on a flow equalizaton baffle located in the intermediate section of a closed flow vessel with laminar regime, FIG. 3 is a diagram showing the theoretical distribution of areal openings on a flow equalization baffle located in the intermediate section of a closed vessel with turbulent flow, FIG. 4 is a cross section of a closed fluid flow vessel equipped with a set of flow uniformizing baffles in its intermediate section and one at its affluent section, all of the openings being patterned after the principles of FIGS. 1–3, FIG. 5 is a plan view of those flow uniformizing baffles of FIG. 4 which precede the last intermediate section baffle, FIG. 6 is a cross-section of a vessel provided with a flat, orificed, effluent training baffle held in a joint, FIG. 7 is a top plan view of the fluid flow vessel of FIG. 6, FIG. 8 is a cross-section of a fluid flow vessel as in FIG. 6 but with a dished effluent training baffle bumped away from the outlet, FIG. 9 is a cross section of a closed fluid flow vessel in which the distributive outlet baffle is attached to the cover, FIG. 10 is a top plan view of the vessel shown in FIG. 9, and FIG. 11 is a cross section through a baffle composed of wire mesh or similar material.

In FIGS. 4, 6, 8 and 9 only the intermediate and effluent parts of the closed flow vessel are shown since the details of entry are beside the subject of this invention.

In all of the diagrams and views except FIG. 11 the orifices have been shown as circular as a matter of convenience, however any other shape will suffice provided the necessary partition of area is maintained.

Each of the drawings will now be considered specifically.

UNDERLYING PRINCIPLE IN THE DISTRIBUTION OF OPENINGS

Refer to FIG. 1 which illustrates the distribution of passageways over the surface of a flow equalization baffle:

A sector of a baffle 1 of radius $r$ with center at C is mounted within shell 2 of a closed vessel of radius R. Openings 3 are shown as circular orifices, regularly arranged in radial alignment for convenient illustration, however in practice the holes may be any desired shape and their placement irregular, according to circumstances, provided the fundamental principle of areal concentration of openings per unit bulk baffle area increasing with radial displacement as formulated below is followed.

Strike arcs $r_1$, $r_2$, $r_3$ and $r_4$, here shown at equal intervals for illustration, through the centers of the respective circular rows of holes, outward from the center C of the baffle; let the areas of each hole in the respective annular rows be $a_1$, $a_2$, $a_3$ and $a_4$.

Drawn medians $m_1$, $m_2$, and $m_3$ equidistant between the centers of adjacent circumferential rows of orifices. Denote the area of any elemental enclosure such as $hijk$, bounded by adjacent pairs of radial and circumferential medians by $b_1$, $b_2$, $b_3$ and $b_4$, respectively. Only area $b_3$ is marked in the figure. These areas represent the gross contiguous baffle areas associated with its own particular flowage opening.

Such an area may also be described as that enclosed by median drawn between all openings adjacent the one considered.

Let $n_1$, $n_2$, $n_3$ and $n_4$ be the number of openings in the corresponding ring as denoted by the subscript around the baffle. Then the basic principle for arranging an orifice pattern is to make $$n_1 a_1 < n_2 a_2 < n_3 a_3 < n_4 a_4$$

or, representing a general number by $x$ $$n_{x-1} a_{x-1} < n_x a_x$$

and the ratio of orifice area with respect to the contiguous gross baffle area or medially bounded surrounding area increases radially outward from the axis or center C of the baffle as $$\frac{a_1}{b_1} < \frac{a_2}{b_2} < \frac{a_3}{b_3} < \frac{a_4}{b_4}$$

or in general terms $$\frac{a_{x-1}}{b_{x-1}} < \frac{a_x}{b_x}$$

This relationship between areas of openings and their position differs fundamentally from that of a sheet of wire mesh screen, an ordinary sieve or a uniformly perforated baffle wherein corresponding notation would show $$a_1 = a_2 = a_3 = a_4$$

or $$n_{x-1} a_{x-1} = n_x a_x$$

and $$\frac{a_1}{b_1} = \frac{a_2}{b_2} = \frac{a_3}{b_3} = \text{constant}$$

Resuming with baffle 1, in like manner the area A of the annulus 4 having width $R-r$ is greater than that of the outermost ring of orifices at radius $r_{max}$, thus $$A > n_{max} a_{max}$$

Application of this principle of inverse areal distribution of openings with respect to their radial displacement will be discussed further as it affects:

(A) Intermediate or run of vessel baffling
    (a) With laminar flow
    (b) With turbulent flow
(B) Effluent control baffling.

INTERMEDIATE ZONE BAFFLES

Laminar flow

For laminar flow, Reynolds number $R < 2,000$, in tubes the central velocity $v_c = 2 \times$ mean velocity $v_m$; the wall velocity is zero. Many textbooks, for example "Fluid Mechanics and Hydraulics" by Ronad V. Giles, 2nd Edition, Schaum Publishing Co., New York, N.Y., 1962, p. 101, show a parabolic variation in velocities $v_x$ with distance $x$ from the center of a pipe of radius $r$, according to the expression $$v_x = \frac{p_1 - p_2}{4\mu l}(r^2 - x^2) \quad (1)$$

wherein $p_1 - p_2$ is the pressure drop in a fluid of viscosity $\mu$ through a length $l$.

In order to cancel the tendency for velocity to increase centrally placement of openings of area $a_x$ along any radius must be the inverse of the original velocity distribution, thus $$a_x = \frac{1}{\frac{p_2 - p_2}{4\mu l}(r^2 - x^2)} \quad (2)$$

which shows the theoretical value of passageway area on baffles in the intermediate or reaction zone of a closed flow vessel. This equation shows a small finite opening at the axis of the pipe equal to $$\frac{4\mu l}{(p_1 - p_2)r^2} \quad (3)$$

which increases in value radially to infinity or a clear opening at the walls.

The variation algebraically in area of opening with radial position follows from $$\frac{da_x}{d_x} = \frac{2x}{\left[\frac{p_1 - p_2}{4\mu l}(r^2 - x^2)\right]^2} \quad (4)$$

However, for simplicity the open areas around any circular path may be proportioned by simple division of the parenthetical term in Equation 2 above. Neglecting higher terms $$\frac{1}{r^2 - x^2} = \frac{r}{r^2} + \frac{x^2}{r^4} \quad (5)$$

which indicates the area of openings will vary approximately with the square of their radial displacement.

Graphical determination of distribution of openings

In FIG. 2, showing the distribution of velocities during laminar flow across the diameter $dd$ in the body section of a closed tube 2, $dswd$ is a parabola, symmetrical about central axis $mm$ and intersecting the diameter $dd$ as a baseline at the inside walls. Any ordinate from $dd$ to the parabola represents the velocity at that point. A radius $sq$ is drawn tangent from vertex $s$.

Drop any convenient number, say five, of equidistant verticals like $vw$ from the top tangent $sq$ to intersect the curve as at $w$. Since velocity at the walls is zero, only a completely open area of baffle, or annulus offering no resistance is required at this point; the percentage of open area is 100. The length $qd$ then represents 100% aperture. Similarly at the center $s$, where flow is a maximum, the area of orifice should be zero or minimal, as indicated by absence of spacing between $sq$ and the parabolic arc $swd$. Likewise at intermediate points along a radious, such as $v$, the relative amount of opening for fluid passage is length $vw$, expressed as a percentage of length $qd$.

Turbulent flow

For turbulent flow, $R > 2,000$, the central velocity $$v_c = \frac{1}{0.85}$$

or 1.18 times the mean velocity $v_m$. Since the central velocity is only 18% greater than the mean velocity there is comparatively little advantage for baffling a fully turbulent flow. If baffling is desired the simplest flow distribution model to consider is that shown in the textbook "Experimental Engineering" by Rolla C. Carpenter and Herman Diederichs, John Wiley & Sons, New York, N.Y., 1911, p. 411. The ratio of central to wall velocities is approximately 2:1. The variation along a diameter may be represented by a rectangle constructed on a diameter with width equal to half the central velocity, surmounted by an arc of an ellipse having one-half of the center velocity for its major semi-axis and the pipe diameter for its minor axis.

Graphical determination of distribution of openings

In FIG. 3, a plot of the velocity distribution in fully developed turbulent flow across a diameter $dd$ in the intermediate or body section of a closed vessel 2, velocity close to the wall is indicated by the ordinate $de$. Along the diameter the velocity at any point is represented by the sum of rectangle altitude $de$ plus the corresponding half secan $rs$ of a semi-ellipse $efre$ whose long axis is diameter $ee$ and whose half short axis is the increment $cf$ above the top of rectangle $decsdd$. Center $c$ lies along axis $mm$. Thus at point $t$, radially outward from the center $c$ of the vessel, the velocity is equal to the sum $(st + rs) = rt$.

Move, by translation, rectangle $decsedd$ vertically upward so that diameter $dd$ becomes a tangent at the tip of the semi-short axis at $f$. The new upper base of the rectangular velocity component becomes $d'c'd'$. Drop any convenient number, say five, equidistant verticals like $zr$ from the top base $d'c'd'$ to intersect the elliptical arc at $r$.

Peripheral open area may be taken as 100%, represented by intercept $d'e$. At the center $c$ the percent opening will be $$\frac{c'f}{d'e} \times 100$$

Similarly for the intermediate intercepts at any radial offset $cs$ the percent open area will be $$\frac{zr}{d'e} \times 100$$

As noted previously there is relatively less to gain in uniformizing completely turbulent flow than in equalizing laminar flow transverse-wise. A point of diminishing returns is soon reached between process gains and cost of added complexity in baffling turbulent regime.

EFFLUENT SECTION BAFFLE

Velocity distributions in the effluent section have not been mapped in the literature, so a definitive treatment to determine extent of open area in a training baffle cannot be applied as systematically as in the preceding cases. Furthermore, precise placement of openings is impossible except under the specific conditions that both fluid properties and flow rate, also vessel geometry, remain fixed in the condition of original determination. Thus whenever velocity, temperature, amount of solutes, nature and load of suspended material or any variable influencing viscosity or density fluctuates, thereby changing Reynolds number, the transverse velocity profile changes, and there requires some adjustment in baffling.

Even in a given reactor and process the orifice arrangement will vary with travel as the degree of completion advances; even the flow regime may alter when there is considerable viscosity increase. Despite this intimate dependency on existing hydrodynamic features a baffle arranged for average conditions of efflux will produce a definite improvement in vessel performance over the condition without baffling or with a uniformly perforated baffle.

Lacking advance data for precise planning, the most logical assumption is that flow distribution follows qualitatively that for the laminar regime on account of the center-seeking tendency of the currents. Furthermore, flow into the effluent draw-off is mostly from the axial portions and practically none from the peripheral areas. Hence, a flow uniformizing baffle may be perforated inversely according to parabolic flow distribution just as explained graphically in FIG. 2. For certainty of performance the baffle should be tested under conditions of use by means of tracers and adjusted accordingly, either bushing or plugging openings needing constriction, or reaming out those needing enlargement.

Inasmuch as the peripheral annulus permits the freest passage of fluid near the walls, the corresponding inboard openings proportioned according to the principles of FIGS. 2 and 3 will likewise best facilitate flow at their own radaii. Thus this system of baffling will correct flow inequalities with a very minimum loss of head or energy requirement.

Special conditions in the effluent section

In the outlet region, downstream from the effluent flow equalizing baffle, the passageway constructs due to the presence of the end wall and the consequent redirection of flow sheaths from parallel or from turbulent advancement to an accumulation toward the outlet. To this effect due to geometry is added that due to a suction-like influence from the outlet, since fluid is moving toward a region of lower pressure. To overcome the geometric effect the effluent baffle, for best results, is contoured with the bulge forward to meet the current, thereby providing greater space radially inward behind it for flow toward the outlet. To avoid the kinetic funneling of axially flowing fluid into the outlet, the perforations are sized parabolically inversely to natural flow.

As an underlying principle, the loss of head for a rod of fluid due to pressure drop through its orifice plus the friction drop in traversing the effluent chamber in approaching the outlet should be the same for all portions of the fluid. In this way there will be equal contribution of fluid from the entire cross section of the vessel. Considering the contour of the baffle to provide for convergence of stream lines to the outlet, the opening distribution can then be proportioned like a body baffle as a first approximation.

A COMPLETELY CONTROLLED PLUG FLOW VESSEL

The combination of a set of body section training baffles and an effluent equalizing baffle to achieve as close an approach to true uniform or plug type flow through a closed vessel as possible is shown in section in FIG. 4.

Through closed process vessel 5 consisting of an inlet section (not shown), an intermediate body portion 6 and an outlet section 7 fluid flows in the direction indicated by the arrow. Intermediate baffles 8, 8' and effluent baffle 9 keep the flow equalized transversely in their respective regions. Perforations 3 in the intermediate baffles and openings 10 in the effluent uniformizing baffle are proportioned and arranged as explained in the preceding theory. Fluid flows through openings 3 and 10, and annuli 4 and 4' at intermediate and effluent baffles, respectively.

Baffle plates are supported and attached by screws 11, 12 to a series of circumferential lugs 13, 14 joined to the inner wall of the vessel. Baffles 8' and 9 next to flange 15 joining the intermediate and outlet sections of shell 2 are readily removable for cleaning or adjustment of openings, but lower baffles 8 which must pass through one or more lug circles are cut with a diametrical slit 16 to permit them to be withdrawn in halves for side clearance.

Bushings 17 or plugs 18 may be inserted in any of the baffles to trim the flow for attainment of equal distribution as determined necessary by field tests.

FIG. 5 is a plan view of the cleft intermediate baffles 8 showing the diametrical split 16, the distribution of openings 3 and untapped holes 19 for attachment to supporting lugs 13.

MODIFICATIONS OF THE EFFLUENT UNIFORMIZING BAFFLE

Possible variations in structure of the effluent training baffle deal with its shape and method of fastening. One method for support by means of a series of lugs 14 attached to the inner wall of vessel 5 has been illustrated in FIG. 4.

FIG. 6 shows an axial cross section of a closed vessel 5, such as a reaction or contact vessel, in the proximity of its discharge end only. This vessel consists typically of a main body shell 20, a top shell 21 and a discharge conduit or outlet 22. In the interior is a reaction or contact zone 6, an effluent space or discharge zone 7 thereabove, and an effluent flow equalization or training baffle 23 therebetween.

The flow equalization baffle 23, here shown as a flat plate, is held between gaskets 24, 24 in flanges 15 of the main body and top shell, respectively. Bolts 25 join the flanges. Openings 3 in the baffle plate 23 are so sized and arranged as to present greater areas relative to gross baffle area pointwise for flow therethrough as their radial distance from the center increases. Thus openings or orifices 26 near the wall of the vessel are larger and more numerous than centrally located openings 27.

Fluid flow through the vessel is through the functional contact or reaction zone 6 thence through openings 3 in the flow equalization baffle 23 into the discharge zone 7 and finally out through discharge 22. Filaments of fluid flowing near the interior of shell 20 of the main body section 6 are facilitated in passing into the discharge zone 7 by the preponderance in a real distribution of orifices, as stated before, which compensates for the longer paths of travel and related dynamic effects as compared to centrally rising filaments. Flow lines in the supernatant effluent zone 7 are trained to be uniformly distributed. Once past the flow equalization baffle 23 flow lines converge toward the outlet 22.

In the plan view, FIG. 7, the opening 3 in baffle 23 are clearly indicated to be increasing in size, frequency and area relative to gross local area of the baffle as the distance out from the center of the vessel increases.

FIG. 8 shows a flange-retained flow equalization baffle 29 whose shape is a curved surface bulged away from the outlet pipe 22. This shape provides better separation and control of flow filaments than does the flat plate of FIG. 6 as it divides the flow at different levels of the tank instead of only in a single plane across the flanges. Other details are the same as for FIG. 6, and the plan view of FIG. 7 may be considered to represent this version qualitatively without projective exactitude.

A third possibility in curvature of the equalization baffle is a dish with bulge toward the outlet. However, this variant is disadvantageous since it actually promotes centrally seeking currents; also it interferes with convergence of flow in the outlet zone 7 and hence would be worse in effect than no baffle at all.

FIG. 9 shows a modification of the equalization baffle 30 in which the shape is conical with the apex 31 pointed against the direction of flow. As illustrated here the slant elements of the conical surface are straight lines, however these could be curvilinear. If convex upward, the shape would resemble the mouth of a trumpet (net illustrated); if convex downward, the baffle would be dished as in FIG. 8.

The discharge dome 21 and the main body section 20 of vessel 5 are connected by flanges 15 with gaskets 24 between them. Here equalization baffle 30 is suspended by long bolts 32 from the underside of dome 21. These bolts are bent as shown at 33 to provide rigidity in mounting the baffle. As before flow near the wall passes through annulus 4'. As before this baffle is perforated by a plurality of openings 3, arranged at a distance from its center so as to obstruct the axial currents and permit freer passage to the peripheral flow in such a manner that the rate of flow within the main body 6 of vessel 2 approaching the baffle is substantially uniform. Uniform flow will then be retained completely to the inlet of the vessel provided adequate dispersion has been arranged there and equalization baffling installed in the intermediate zone.

In FIG. 10, the plan view of FIG. 9 looking down on the outlet 22, the disposition of openings 3 in the conical baffle 30 are more clearly indicated, showing their areal preponderance relative to local gross baffle surface as their radial distance from the central apex 31 increases. A peripheral annulus 4' between the edge of the baffle and the wall 20 of vessel 2 allows further easement for passage of the outermost filaments of fluid. Holes 34 are drilled elongatedly to slip over suspension bolts 32.

FIG. 11 shows a method of graduating hydraulic resistance either on intermediate baffling or on an effluent baffle, by altering the length of travel through orifices of a rigid, open mesh composite 35. Wire screen is the usual material of choice. This is a built up baffle structure comprising a plurality of layers 36, here drawn as three, of concentric meshed discs preferably in sequential order, the disc diameter of each layer so selected that the total thickness at a point varies directly as the transverse distribution of velocities discussed with FIGS. 2 and 3. Maximum number of layers is at the center of the baffle, decreasing with radial distance outward. This variation, being an impediment, is opposite to the partition of open areas previously discussed. The separate layers may be fastened together by any well-known method, such as spot welding (not shown) and the manner for attachment of the composite meshed baffle to the shell 2 of the vessel may be any of those previously shown with plate type baffles of FIGS. 4, 6, 8 and 9, or other obvious methods. Although the wire mesh baffle illustrated is flat, a conical or dished shape likewise is satisfactory. The wire mesh baffle may reach across the full diameter of the vessel, or may be separated from the inner wall by an annulus, as with baffles made of plate. FIG. 11 shows a preferred sequential arrangement of the mesh discs in the order of increasing overall diameter. While they may be stacked in any other order provided concentricity with the axis of the vessel is observed their influence on flow distribution will vary somewhat.

In summation, the best embodiment of the effluent equalization baffle are either conical or dished shapes, with their apex or convexity, respectively, pointed away from the outlet. This configuration allows increasing volume downstream from the baffle between it and the end wall radially inward to accommodate the increase in bulk of fluid as it approaches the outlet. Intermediate baffling may remain a simple, perforated flat plate.

In all the modifications of equalizing baffling as described herein a final check or test of uniformity of efflux may be made experimentally during a trial run or during productive use. Tracer materials may be introduced or released through ports around the circumference of the vessel and effluent obtained by sampling tubes inserted through the disconnected outlet down to various portions of the equalization baffling. From such observations and consideration of transit times, bushings 17 or plugs 18 may be inserted in the openings as indicated thereby as a final adjustment to obtain uniformly distributed flow within the bulk of the fluid.

I claim:

1. A series of flow equalizing baffles inside a closed vessel, said vessel having an inlet, an intermediate section, and an outlet, said series of baffles consisting of a plurality of flat plates located in said intermediate section and an effluent control baffle adjacent the outlet of said vessel, said effluent control baffle being a plate contoured as a cone with its apex directed against the direction of fluid flow through said vessel, a plurality of apertures in said baffles, said apertures being sized so that the area of the aperture relative to the baffle area inclosing said apertures and described by a plurality of concentric circles spaced equidistant along a radius, intersecting with radii spaced equi-angularly, increases with radial distance from the center of said baffles, an annular space between the periphery of said baffles and the inner wall of said vessel, whereby the flow of fluid through said vessel becomes evenly distributed over the cross-section of said vessel and into said outlet.

2. A series of flow equalizing baffles inside a closed vessel, said vessel having an inlet, an intermediate section, and an outlet, said series of baffles consisting of a plurality of plates located in said intermediate section, means for support of said baffles, a plurality of apertures in said baffles, said apertures being sized so that the area of the aperture relative to the baffle area inclosing said apertures and described by a plurality of concentric circles, drawn through the medians between said apertures, intersecting with radii passing through medians on both sides of said apertures, increases with radial distance from the center of said baffle, whereby the flow of fluid through said vessel becomes evenly distributed over the cross section thereof.

3. The series of baffles in claim 2 in which said plurality of plates are flat.

4. The series of baffles in claim 2 in which an annular space lies between the periphery of said baffles and the inner wall of said vessel.

5. An effluent control baffle inside a closed vessel, said vessel having an inlet, an intermediate section, and an outlet, said effluent control baffle located adjacent the outlet of said vessel, means for support of said effluent control baffle, said effluent control baffle being a plate containing a plurality of apertures, said apertures being sized so that the area of the aperture relative to the baffle area enclosing said apertures and described by a plurality of concentric circles drawn through medians between said apertures, intersecting with radii passing through medians on both sides of said apertures increases with radial distance from the center of said baffle, whereby the flow of fluid leaving said vessel becomes evenly distributed over the cross section thereof immediately in advance of said effluent control baffle.

6. The effluent control baffle of claim 5 in which said plate is contoured as a bowl with its convexity directed against the direction of fluid flow through said vessel.

7. The effluent control baffle of claim 5 in which said plate is contoured as a cone with its apex directed against the direction of fluid flow through said vessel.

8. The effluent control baffle of claim 5 in which an annular space lies between the periphery of said effluent control baffle and the inner wall of said vessel.

9. A series of flow equalizing baffles inside a closed vessel, said vessel having an inlet, an intermediate section, and an outlet, means for supporting said baffles, said baffles consisting of a plurality of plates of open mesh material located downstream from the inlet of said vessel, said plates composed of a plurality of concentric layers, means for fastening said layers together, layers on a given plate being of different overall diameters, said diameters being sized so that the length of fluid path through said plates at a given locus decreases with radial distance from the center of said baffles whereby the flow of fluid through said vessel becomes evenly distributed over the cross section of said vessel and into said outlet.

10. The open mesh baffle as in claim 9 in which an annular space separates the periphery of said baffle from the inner wall of said vessel.

References Cited

UNITED STATES PATENTS

| | | | |
|---|---|---|---|
| 728,105 | 5/1903 | Hipple et al. | 181—69 |
| 2,312,639 | 3/1943 | Gronemeyer | 138—40X |
| 2,343,560 | 3/1944 | Klein et al. | 138—37 |
| 3,109,459 | 11/1963 | Lee II, et al. | 138—40 |
| 3,353,564 | 11/1967 | Bergeijk et al. | 138—41 |
| 3,519,024 | 7/1970 | Johnson et al. | 138—41 |

LAVERNE D. GEIGER, Primary Examiner

R. J. SHER, Assistant Examiner

U.S. Cl. X.R.

138—37, 41